Oct. 7, 1952 — J. W. GOFF — 2,613,311
ELECTRICAL HEATING DEVICE FOR POULTRY WATERING BOWLS
Filed Jan. 25, 1950
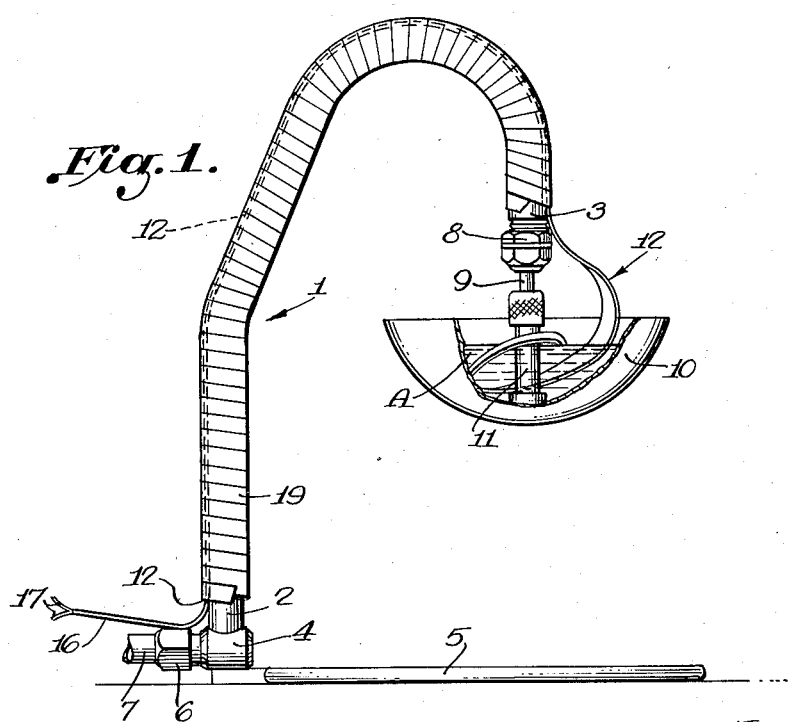
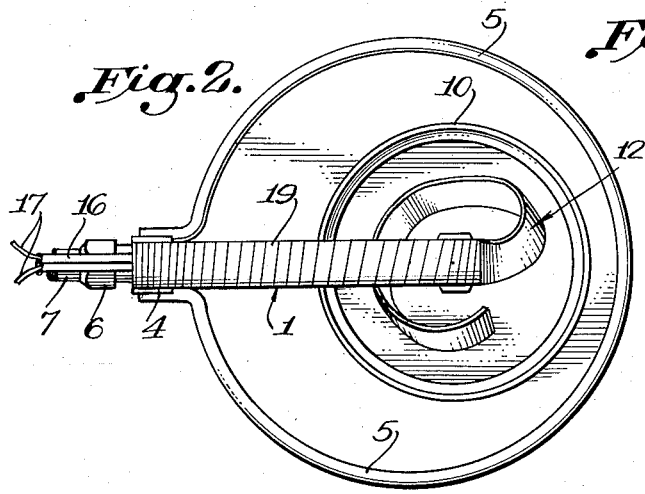
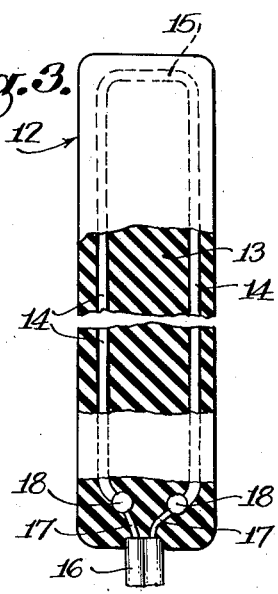
Inventor,
JOHN W. GOFF.
By Merchant & Merchant
Attorneys, Patented Oct. 7, 1952

2,613,311

UNITED STATES PATENT OFFICE 2,613,311

ELECTRICAL HEATING DEVICE FOR POULTRY WATERING BOWLS

John W. Goff, St. Paul, Minn., assignor to Miller Manufacturing Company, Incorporated, St. Paul, Minn., a corporation of Minnesota Application January 25, 1950, Serial No. 140,431

2 Claims. (Cl. 219—38)

My invention relates generally to electrical heating devices and, more specifically, to electrical heating devices for poultry watering bowls, stock feeding tanks, and the like.

A highly important object of my invention is the provision of a heating device which may be attached to the supply pipe of a poultry watering bowl or the like, whereby the drinking water may be warmed to a pre-determined degree before entering the drinking bowl.

Another object of my invention is the provision of a feeding device, as set forth, which will maintain the water in the feeding bowl at a pre-determined temperature.

Another important object of my invention is the provision of an electrical heating device having a wire heating element imbedded in an elongated strip of rubber-like material and connected to the wires of an electrical conduit within said strip.

A still further object of my invention is the provision of means for maintaining the above-mentioned heating device in surface contact with the supply pipe.

Still another object of my invention is the provision of an electrical heating device as set forth, which is simple and inexpensive to manufacture, rugged in construction, and efficient and durable in use.

Other highly important objects and advantages of my invention will become apparent from the following detailed specification, appended claims, and attached drawings.

Referring to the drawings, wherein like characters indicate like parts throughout the several views:

Fig. 1 is a view in side elevation of a poultry watering bowl having my novel heating device attached thereto, some parts being broken away and some parts being shown in section;

Fig. 2 is a plan of the device of Fig. 1; and

Fig. 3 is an enlarged view in plan of the heating strip of my invention, some parts being broken away and some parts being shown in section.

Referring with greater particularity to the drawings, the numeral 1 indicates, in its entirety, an inverted U-shaped rigid supply pipe section having one relatively long leg 2 and one relatively short leg 3. The long leg 2 terminates at its base in an elbow 4 to which is secured by welding or the like a looped supporting member 5. A laterally-extending coupling nipple 6 has threaded engagement with the elbow 4; and a conduit 7, preferably in the nature of a hose, is adapted to be connected thereto and deliver water therethrough from a suitable source of supply not shown.

The short leg 3 terminates in substantially parallel laterally offset relationship to the long leg 2 and in substantial spaced relation to the ground when the supporting member 5 is in engagement with the ground surface as indicated in Fig. 1. The lower end of the short leg 3 is threaded to receive a coupling 8 which couples a downwardly-projecting pipe extension 9 thereto. The lower end of the pipe extension 9 is equipped with an automatic valve mechanism for controlling the flow from the rigid pipe section 1 into a cup or bowl 10 and maintaining a substantially constant fluid level in the same. The valve mechanism is not shown but is contained within a tubular element 11, the lower end of which is secured to the intermediate bottom portion of the bowl 10. The automatic valve mechanism does not constitute a part of the instant invention. For this reason, illustration thereof is not deemed necessary. However, said valve mechanism is fully disclosed in my copending United States patent application S. N. 21,626, filed April 17, 1948, and entitled "Device for Watering Animals, Poultry, and the Like."

For heating the water in the supply pipe section 1 and in the bowl 10, I provide an electrical heating device 12 comprising an elongated moulded strip 13 of rubber or the like having imbedded therein a generally U-shaped section of electrical resistance wire 14 such as "Nichrome" or the like. As shown, the heating wire 14 extends longitudinally of the strip 13, the intermediate portion thereof being closely inwardly spaced from one end thereof as indicated at 15. At its opposite end, strip 13 has imbedded therein one end of an electric conduit 16 carrying two conductor wires 17, one each of which is soldered or otherwise secured to an opposite end of the heating wire 14 as indicated at 18. The arrangement of the connections 18 and the imbedding of the end of the conduit 16 in the strip 13 protects the heating device from being short-circuited due to moisture which might otherwise come into contact with bare wires.

To utilize my novel heating device in the heating of drinking water, the heater 12 is disposed along the supply pipe section 1 in surface contact therewith and fastened thereto by any suitable means such as a winding of friction tape or the like 19. The strip 13 is sufficiently long to permit the free end thereof to extend downwardly from the end of the shorter leg 3 into the bowl or reservoir 10 so that the free end of the strip 13 is submerged in the drinking water A therein. When current is applied to the conductor wires 17, heat generated in the strip 13 will be conducted to the supply pipe section 1 and to the water A in the bowl 10. By this means, the drinking water is warmed to a predetermined degree before it enters the bowl 10 and is maintained as long as necessary.

While I have shown a commercial embodiment of my invention, it will be understood that the same is capable of modification without departure from the spirit and scope of the invention as defined in the claims.

What I claim is:

1. In a device of the class described, a liquid reservoir, a supply pipe for the reservoir, said reservoir depending from the supply pipe in spaced relation to the ground, and a heating device for the liquid in said supply pipe and reservoir, said heating device comprising an elongated strip of moulded rubber-like material, a generally U-shaped wire heating element imbedded in said strip for the greater portion of the length of the strip, and a two-conductor electrical conduit having one end imbedded in one end of the strip, the conductors of said conduit being connected one each to an opposite end of said heating element within said strip, said heating device for a portion of its length being in surface contact with said supply pipe, the free end of said heating device extending downwardly into said reservoir below the normal liquid level thereof.

2. The structure defined in claim 1 in further combination with means for securing said strip to said supply pipe.

JOHN W. GOFF.

REFERENCES CITED

The following references are of record in the file of this patent:

UNITED STATES PATENTS

| Number | Name | Date |
| --- | --- | --- |
| 1,936,391 | Harrower | Nov. 21, 1933 |
| 2,048,880 | Morgan | July 28, 1936 |
| 2,052,644 | Murphy | Sept. 1, 1936 |
| 2,201,901 | Keen | May 21, 1940 |
| 2,329,766 | Jacobsen | Sept. 21, 1943 |
| 2,464,052 | Numrich | Mar. 8, 1949 |
| 2,479,355 | Hemker | Aug. 16, 1949 |

OTHER REFERENCES

"Modern Plastics," pages 108–9, Aug. 1946.